United States Patent
Bodenstein et al.

(10) Patent No.: US 11,970,061 B2
(45) Date of Patent: Apr. 30, 2024

(54) INPUT ASSEMBLY WITH ACTIVE HAPTIC FEEDBACK AND SUPPRESSION OF INTERFERING VIBRATIONS

(71) Applicant: PREH GMBH, Bad Neustadt a. d. Saale (DE)

(72) Inventors: Tobias Bodenstein, Salz (DE); Andreas Kramlich, Bad Neustadt a.d. Saale (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 128 days.

(21) Appl. No.: 17/051,000

(22) PCT Filed: Feb. 17, 2020

(86) PCT No.: PCT/EP2020/054060
§ 371 (c)(1),
(2) Date: Oct. 27, 2020

(87) PCT Pub. No.: WO2020/229000
PCT Pub. Date: Nov. 19, 2020

(65) Prior Publication Data
US 2023/0113215 A1    Apr. 13, 2023

(30) Foreign Application Priority Data
May 13, 2019 (DE) .................. 10 2019 112 461.1

(51) Int. Cl.
*G06F 1/16* (2006.01)
*B60K 37/06* (2006.01)
*G06F 3/01* (2006.01)

(52) U.S. Cl.
CPC .............. *B60K 37/06* (2013.01); *G06F 3/016* (2013.01); *B60K 2370/158* (2019.05)

(58) Field of Classification Search
CPC .............. B60K 37/06; B60K 2370/158; B60K 2370/128; B60K 2370/1434; B60K 2370/1438; G06F 3/016; G05G 5/03
See application file for complete search history.

(56) References Cited

U.S. PATENT DOCUMENTS 8,760,248 B2   6/2014 Marie
9,690,412 B2   6/2017 Tissot
(Continued)

FOREIGN PATENT DOCUMENTS

DE   102016005875 A1   11/2017
DE   102016114697 A1   2/2018
(Continued)

OTHER PUBLICATIONS

European Office Action: Communication Pursuant to Article 94(3) EPC for European Application No. 20706184.7 dated Nov. 9, 2021, European Patent Office, Munich, Germany.
(Continued)

*Primary Examiner* — Ibrahim A Khan
(74) *Attorney, Agent, or Firm* — M&B IP Analysts, LLC

(57) ABSTRACT

The invention relates to an input assembly, comprising a carrier, an input part, which is mounted on the carrier in a manner capable of vibrating along at least one direction of movement) by means of mounting means, with an input surface intended to be touched by an operator and with a touch-detection device for detecting a touch upon the input surface by the operator, an electromagnetic actuator for exciting a movement of the input part along the direction of movement by means of an electric control signal in order to generate a haptic feedback for the operator in the case of a touch by the operator, wherein the actuator has a resiliently mounted additional mass and the actuator is attached to the input part via a vibration isolator.

19 Claims, 3 Drawing Sheets

(56) References Cited

U.S. PATENT DOCUMENTS

| | | | |
|---|---|---|---|
| 10,345,910 B1* | 7/2019 | Khoshkava | H10N 30/886 |
| 10,504,342 B1* | 12/2019 | Khoshkava | G08B 6/00 |
| 2002/0149561 A1 | 10/2002 | Fukumoto et al. | |
| 2004/0075676 A1* | 4/2004 | Rosenberg | A63F 13/245 |
| | | | 715/701 |
| 2008/0084384 A1* | 4/2008 | Gregorio | G06F 3/016 |
| | | | 345/156 |
| 2009/0167677 A1* | 7/2009 | Kruse | G16H 20/30 |
| | | | 345/156 |
| 2012/0232780 A1* | 9/2012 | Delson | A63F 13/285 |
| | | | 340/407.1 |
| 2015/0054769 A1* | 2/2015 | Kamata | G06F 3/041 |
| | | | 345/173 |
| 2015/0133221 A1* | 5/2015 | Danny | A63F 13/92 |
| | | | 345/184 |
| 2016/0224115 A1* | 8/2016 | Olien | G06F 3/04883 |
| 2018/0059794 A1* | 3/2018 | Nakamura | H02K 33/02 |
| 2018/0364806 A1 | 12/2018 | El-Ouardi et al. | |
| 2019/0324545 A1* | 10/2019 | Miyamoto | G06F 3/044 |
| 2019/0385420 A1* | 12/2019 | Khoshkava | F16F 15/005 |
| 2020/0348757 A1* | 11/2020 | Forest | G06F 1/1616 |

FOREIGN PATENT DOCUMENTS

| | | |
|---|---|---|
| DE | 102016223021 A1 | 5/2018 |
| EP | 3650993 A1 | 5/2020 |
| WO | 2012052635 A1 | 4/2012 |
| WO | 2019003254 A2 | 1/2019 |

OTHER PUBLICATIONS

German Office Action for German Patent Application No. 10 2019 112 461.1 dated Dec. 11, 2019, German Patent and Trademark Office, Munich, Germany.

The International Search Report and The Written Opinion of the International Searching Authority for PCT/EP2020/054060, dated May 12, 2020, ISA/EPO, Rijswijk, The Netherlands.

* cited by examiner

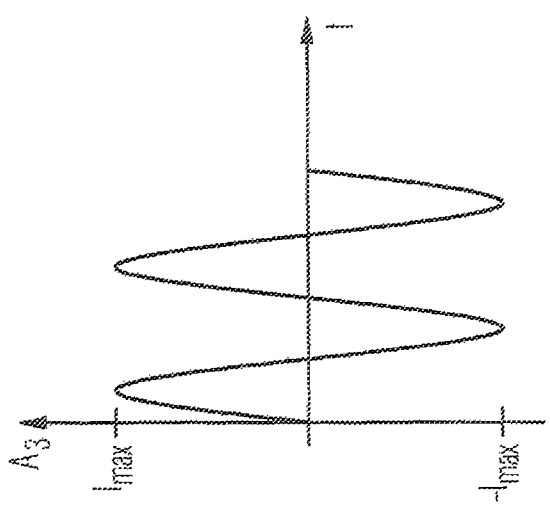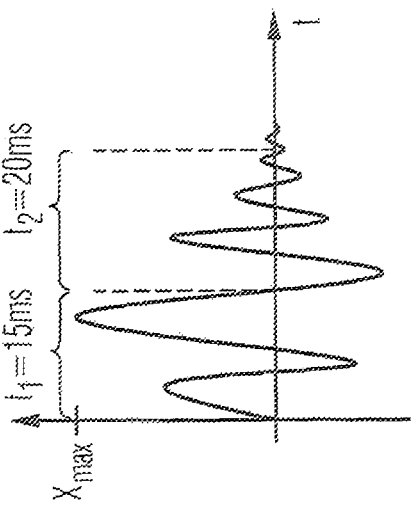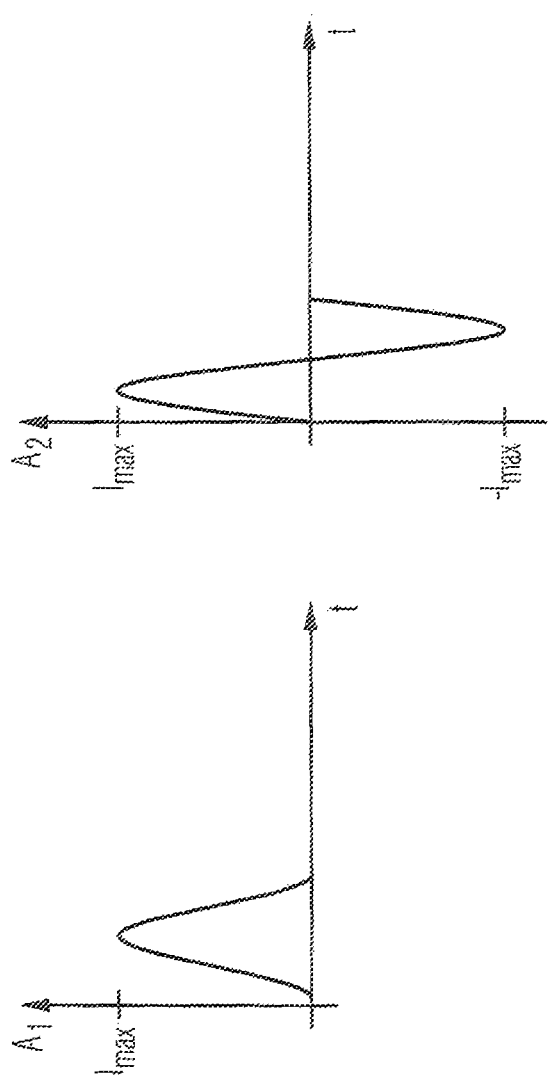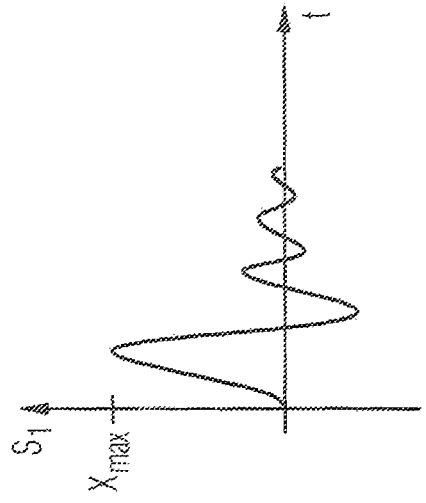

INPUT ASSEMBLY WITH ACTIVE HAPTIC FEEDBACK AND SUPPRESSION OF INTERFERING VIBRATIONS

CROSS-REFERENCE TO RELATED APPLICATIONS

This application claims priority under 35 U.S.C. § 371 to the International Application No. PCT/EP2020/054060, filed Feb. 17, 2020, and to the German Application No. 10 2019 112 461.1, filed May 13, 2019, now pending, the contents of which are hereby incorporated by reference.

The invention relates to an input assembly with an active haptic feedback. An active haptic feedback is understood to be a movement of an input part belonging to an input assembly which is caused by an actuator, also referred to as an actuating element, and which is perceptible as a haptic sensory impression when the input part is touched by an operator. Generic input assemblies have a carrier and an input part, which is mounted on the carrier along at least one direction of movement by means of a mounting device capable of vibrating. In this case, the input part has an input surface intended to be touched by an operator and a touch-detection device for detecting a touch upon the input surface by the operator. An actuator for exciting a movement of the input part along the direction of movement by means of an electric control signal is also provided, in order to generate a haptic feedback for the operator.

Typically, the haptic feedback, i.e. the application of the electric control signal to the actuator, is triggered by touching the input surface and/or applying an actuating force exceeding a predetermined force value to the input surface. Mostly, a forced movement of the input part is desired in this case, which conveys to the operator a sensory impression which he experiences when actuating a mechanical push button. It was found that this sensory impression can be caused comparatively well by short, one-time deflections of the input part with a subsequent overshoot that is as small as possible. The difficulty arising in the process is primarily produced by the actuating mechanism. On the one hand, the technology applied in this case has to be able to cause large and rapid deflections of the input part, be as unsusceptible with regard to electrical interference as possible, cause as little electromagnetic interference as possible itself and, in addition, be as durable, space-saving and inexpensive as possible. For this reason, electromagnetically operating actuators consisting of an electric coil and an armature cooperating with the magnetic field generated by the coil have proved suitable.

In addition to the vibrationally mounted input part, they usually have a resiliently mounted additional mass serving for generating or reinforcing the haptic effect. Actuators of this type are commercially available as so-called linear resonant actuators (LRA), for example, and are particularly suitable for a vibrating oscillation excitation. For example, an actuator, which is attached directly to the input part, with a vibrationally mounted additional mass is known from WO 2012052635 A1. Thus, the reverberations of the additional mass are also transmitted on to the input part almost undamped. However, the operator expects, as the haptic feedback, as brief a deflection of the input part as possible. Reverberations are perceived as disruptive because they blur the haptic sensory impression of the initial deflection. The goal is therefore to reduce or even suppress the transmission on to the input part of the reverberation of the resiliently mounted additional mass provided by the actuator.

Therefore, the inventors have set themselves the task of providing an input assembly in which electromagnetic actuators with a resiliently mounted additional mass, with the accompanying advantages, such as a reduction of costs, required space and immunity from malfunctions, can be used for generating the active haptic feedback, but in which the accompanying drawback of an unwanted transmission of the reverberations on to the input part can be minimized. This object is achieved by an input assembly according to claim 1. Advantageous embodiments are in each case the subject matter of the dependent claims.

The input assembly according to the invention is a touch-sensitive input assembly generating a haptic feedback which is also referred to as a touch-sensitive input assembly with an active haptic feedback. The input assembly comprises a carrier. The latter serves, for example, for fixing the input assembly on a trim, a dashboard, a console or a vehicle body of a vehicle, particularly of a motor vehicle.

The input assembly according to the invention further comprises an input part, which is mounted on the carrier in a manner capable of vibrating along at least one direction of movement. The input part has an input surface intended to be touched by an operator and a touch-detection device for detecting a touch upon the input surface by the operator. The term input part is to be interpreted broadly and is to include an input part, for example, in which only the touch as such is detected, i.e. not in a spatially resolved manner, like a button with touch detection. However, input parts detecting in a spatially resolving manner, such as a touchpad or a touchscreen, are to be included by the invention, in which information relating to the touch location is outputted in addition to the touch detection result. Such input parts include an electrode structure for producing an array of measuring capacitances, for instance, the influence on which by being touched with a finger is detected.

A mounting capable of vibrating is understood to be a mounting of the input part on the carrier in which the input part can be displaced from a rest position parallel to the direction of movement against a returning force, respectively, which acts so as to return the input part into a rest position. That means that a movement from and back into a rest position of the input part is caused by returning means, such as springs that are provided. For example, the input part is mounted by means of several leaf springs, e.g. 3 or 4. Preferably, the direction of movement is substantially orthogonal to the input surface. According to an alternative configuration, the direction of movement is oriented parallel to the input surface. According to a preferred configuration, the means for vibration-capable mounting further include one or more vibration dampers for causing a damping of the relative movement between the input part and the carrier.

According to the invention, an electromagnetic actuator for exciting a movement of the input part along the direction of movement by means of an electric control signal is also provided, in order to generate, in the case of a touch by the operator, a haptic feedback for the operator by the latter haptically perceiving the movement of the input part. The direction of action of the actuator in this case substantially corresponds to the direction of movement. A electromagnetic actuator is understood to be an actuator comprising an electric coil and an armature, e.g. consisting of a paramagnetic or ferromagnetic or permanently magnetic material, cooperating with the magnetic field generated by the coil. Generally, the actuator has a driving part and a driven part which may also coincide. With respect to the construction, the term electromagnetic actuator is not to be understood in a limiting manner; for example, the coil may move as a driven part relative to the armature when an electric control signal is applied and the armature may rest, or conversely, the armature may be the driven part. Moreover, the armature may be configured as a plunger armature, wherein the armature remains at least partially within the hollow volume enclosed by the coil during the application of the control signal and the movement resulting therefrom. Preferably, the actuator is configured as a linear resonant actuator (LRA).

According to the invention, the actuator includes a resiliently mounted additional mass, and the actuator is attached to the input part via a vibration isolator. It is preferably provided that the vibrational degree of freedom of the additional mass is parallel to the direction of movement. In a preferred configuration, the actuator is not supported on the carrier in order to decouple the carrier from the actuator. Preferably, the actuator is attached exclusively to the input part, and more preferably exclusively to the input part and in the latter case attached to the input part exclusively via the vibration isolator. A vibration isolator is understood to be a component by means of which the transmission of the vibration of the additional mass on to the input part is damped and/or decoupled. The goal is thus a reduced transmission, up to decoupling, of the vibration of the actuator-side additional mass from the input part. For example, the natural frequency of the vibration isolator differs, at least in the direction of movement, from that of the vibrating system consisting of the additional mass and its resilient mounting. The natural frequency of the vibration isolator is determined, for example, by the elasticity of the vibration isolator in the direction of movement, among other things.

In the case of an intended impact excitation of the input part, because of the vibration isolator, such actuators with a vibrationally mounted mass that reinforces the actuator excitation can be used without the reverberation behavior of the latter having a negative effect on the haptic feedback. As regards the determination of the natural frequency, generalized coordinates are used, for example, or reference is made in each case to the vibrational degree of freedom of the direction of movement. Moreover, the natural frequency of the vibrating system consisting of the additional mass and its resilient mounting is defined, if applicable, not only by the mass value of the additional mass, but by the mass of another component, which is moved along and is rigidly connected to the additional mass.

Preferably, the actuator, when an electric control signal is applied, has a driven part, such as the coil or the armature, which is attached to the input part via the vibration isolator and on which the additional mass is resiliently mounted. In one embodiment, for example, the armature is attached as a driven part to the input part via the vibration isolator, whereas the additional mass is resiliently mounted relative to the armature, e.g. together with the coil. In an alternative embodiment, for example, the coil is attached as a driven part to the input part via the vibration isolator, whereas the additional mass is resiliently mounted on the coil. Preferably, the input assembly comprises an electronic control system for applying a control signal to the actuator, wherein the control signal is configured as a pulse signal, such as a Gaussian pulse signal, or as a sine or cosine signal, preferably a square-wave signal. Most preferably, the control signal is generated by pulse width modulation by means of the electronic control system.

It is preferably provided that a natural frequency of the vibrating system consisting of the additional mass and its resilient mounting is greater than a natural frequency of the vibration isolator. More preferably, the natural frequency of the vibrating system consisting of the additional mass and its resilient mounting is greater by a factor of $A=\sqrt{2}$ than a natural frequency of the vibration isolator. Thus, the natural frequency of the resiliently mounted additional mass as an excitation frequency lies in the isolation range of the frequency-dependent transmission function of the vibration isolator determined by the damping properties of the vibration isolator. In order to be able to reduce the interval between successive impact excitations of the input part by means of the actuator, comparatively large damping rates of the vibration isolator and the vibrating system consisting of the additional mass and its resilient mounting are preferred. Preferably, the damping in the case of a mass of 40 g of the additional mass is more than 5 Ns/m, more preferably 10 Ns/m.

Preferably, the vibration isolator is wholly or partially formed from a plastic, preferably an elastomer. More preferably, the vibration isolator is wholly or partially formed from a foam, such as PUR foam, PE foam, sponge rubber, silicone elastomer, silicone rubber and/or cellular rubber. For example, the vibration isolator is configured as a composite part and has a plastic component, for example, and a metal component connected thereto positively, frictionally or by substance-to-substance connection.

For example, the vibration isolator is attached to the input part and the actuator, preferably the driven part thereof, in a frictional manner or by substance-to-substance connection. For example, an adhesive layer is provided between the vibration isolator and the actuating element and between the vibration isolator and the input part.

Preferably, the vibration isolator, at least in the rest position of the input part, is disposed in an elastically biased state between the actuator and the input part in order to achieve uniformity in the vibration-isolating effect in the two opposite vibration directions of the additional mass.

Preferably, the thickness of the vibration isolator in the direction of movement is greater than the maximum amplitude of the vibrating system consisting of the additional mass and its resilient mounting in order to avoid a "hard" impact of the actuator on the input part, particularly with an elastically biased vibration isolator. More preferably, the thickness of the vibration isolator in the direction of movement is more than double, even more preferably more than three times the maximum amplitude of the vibrating system consisting of the additional mass and its resilient mounting. For example, the thickness of the vibration isolator is in a range from 1.0 mm to 5.0 mm, more preferably in the range from 2.0 mm to 4.0 mm, such as 2.5 mm.

In order to improve the adhesion of the vibration isolator to the input part or actuator, the vibration isolator according to a preferred configuration is configured as an integral foam.

The embodiments according to the invention are particularly suitable for generating a haptic feedback which is perceived as "precise" by the operator. It is generally known from the literature that the haptic resolution of the human finger perceives two successive vibration amplitudes as separate only starting from an interval in time of ~25 ms. Thus, all vibrations within this time interval, which the input part is subjected to and couples into the finger of the operator via the input surface, are perceived as a single "haptic pulse". The system response to the excitation by the actuator, which is measured at the input part, is preferably designed in such a way, preferably by cleverly choosing the control signal and/or the damping caused by the vibration isolator and/or further damping caused by the optional vibration isolator, that the maximum attainable amplitude of the system response, also referred to as the absolute maximum amplitude, is attained within a time frame of <20 ms, preferably 15 ms, which is triggered, i.e. initiated, by the first haptically perceptible vibration deflection, for example. For the sake of convenience, and presuming an almost undelayed vibration reaction of the input part to the control signal, it is assumed here that the aforementioned time frame is triggered by the start of the control signal.

Most preferably, the first absolute maximum amplitude is attained with the first, or at the latest the second, deflection of the input part.

According to another preferred configuration, the control signal and/or the damping caused by the vibration isolator and/or the further damping caused by the optional vibration isolator are selected such that the "decay time" of the system amplitude measured at the input part, measured from 100% of the maximum amplitude to 10% or less of the maximum amplitude, is <30 ms, preferably <25 ms, most preferably <20 ms.

For this purpose, the duration of the electric control signal, which is generally periodic and which is applied to the actuator, is further limited to a duration of significantly less than 20 ms, i.e. to a few periods, such as 2 periods at most.

By means of this type of control and this type of actuator, a haptic feedback which is perceived as a single pulse can be generated with little effort. Alternatively, the desired decay time can be set by the actuator being controlled with a control signal in antiphase, i.e. with a signal of an opposite polarity, for instance. However, this requires an exact calibration or control or an additional sensor assembly.

The invention further relates to a use of the input assembly in any one of the above-described embodiments in a motor vehicle.

The following Figures additionally explain the invention. The embodiment shown in the Figures is to be understood only as an example and merely represents a preferred embodiment. In the drawing:

FIGS. 3a-3c show illustrations of different control signals according to the invention and associated system responses.

Figure 1:
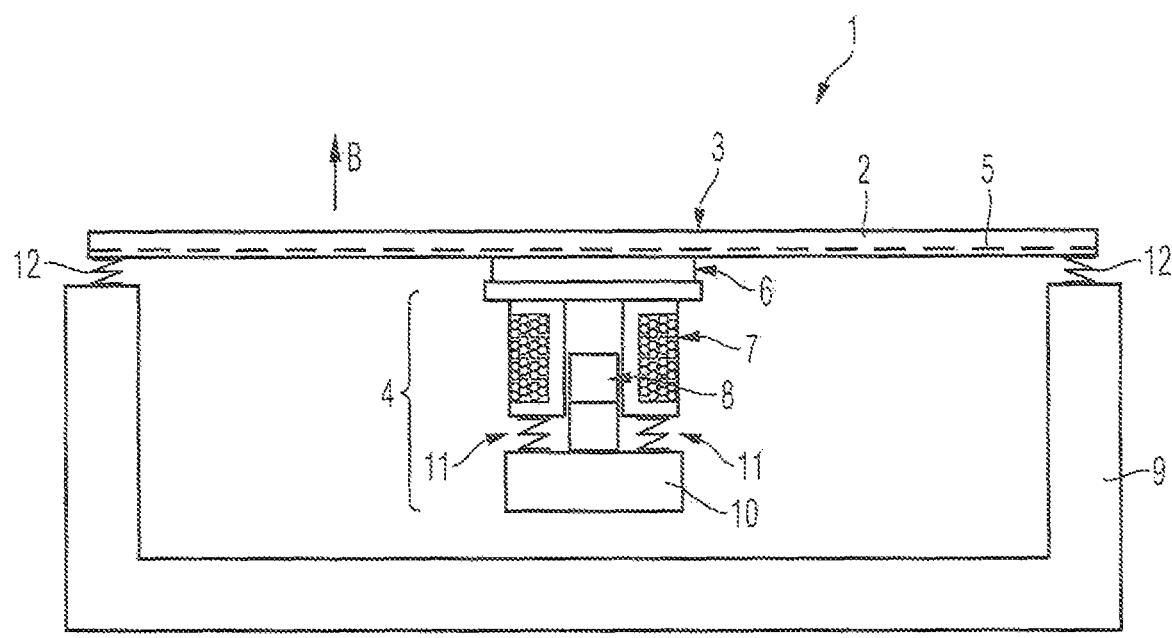
FIG. 1 shows a schematic sectional view of a first inventive embodiment of the input assembly 1.

FIG. 1 schematically shows a first embodiment of the input assembly 1 according to the invention. The latter has a carrier 9 on which an input part 2 is mounted movably and elastically returning into a rest position along a direction of movement B by means of mounting means 12 including springs. Optionally, the mounting means 12 have one or more vibration dampers, which are not shown in detail, for damping the movement of the input part 2 relative to the carrier 9. The input part 2 has an input surface 3 intended to be touched by an operator not shown in detail. The input part 2 is a touchscreen or touch pad, whereby a spatially resolving touch detection is made possible due to a measuring capacitance structure formed from an electrode structure, as a touch-detection device 5. The input assembly 1 further includes an electromagnetic actuator 4 consisting of an electrical coil 7 and an armature 8, which cooperates with the magnetic field of the coil 7 and is preferably at least partially permanently magnetic. When an electric control signal provided by an evaluation unit of the input assembly 1, which is not shown, is applied to the actuator 4, the input part 2 is deflected and moved in the direction of movement B, which is perceived by the operator as a haptic feedback and as a confirmation of the operation of the input assembly 1 performed by touching and/or actuating it. For example, the haptic feedback is triggered by the detection of a touch on the input surface 3 by the touch-detection device 5. The electromagnetic actuator 4 is disposed between the input part 2 and the carrier 9 and has a direction of action in the direction of movement B without being supported on the carrier 9. The electromagnetic actuator 4 is configured as a linear resonant actuator and further includes an additional mass 10, which is resiliently mounted by means of the springs 11 and whose vibrational degree of freedom is substantially parallel to the direction of movement B and which is rigidly attached to the armature 8, whereas the armature 8 and the additional mass 10 are resiliently attached to the coil 7 via the springs 11. The coil 7 of the actuator 4 is attached to the input part 2, on the side facing away from the input surface 3, e.g. in the area of the center of gravity of the input part 2, exclusively via a vibration isolator 6. When a pulse-shaped control signal is applied to the coil, the coil 7 is subjected to a pulse which is transmitted on to the input part 2 via the vibration isolator 6, and thus damped by the vibration isolator 6, while the additional mass 10 with the armature 8 absorbs the counter-pulse. The vibration isolator 6 is provided in order to decouple the input part 2 to the largest possible extent from the reverberations of the additional mass 10 and the armature 8. It consists substantially of an elastomer foam provided with an adhesive layer on the surfaces intended for abutting against the control part 2 and the actuator 4. In order to cause an effective vibration isolation, the natural frequency of the resiliently mounted additional mass 10 in the direction of movement B is greater by the factor of $A=\sqrt{2}$ than the natural frequency of the vibration isolator 6.

Figure 2:
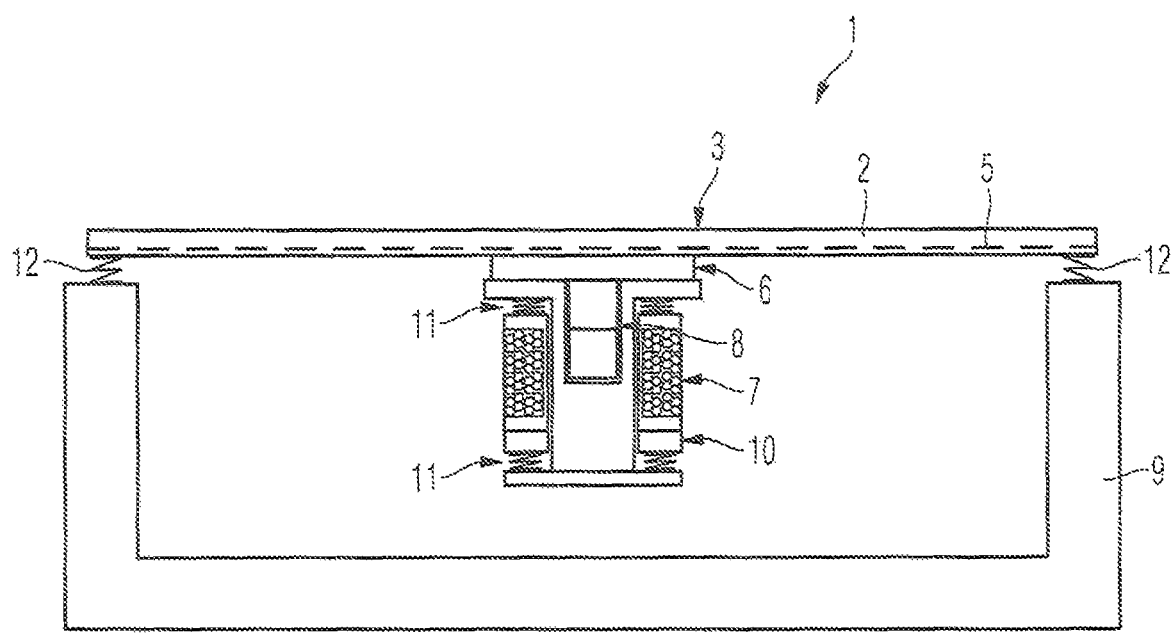
FIG. 2 shows a schematic sectional view of a second inventive embodiment of the input assembly 1.

FIG. 2 schematically shows a second embodiment of the input assembly 1 according to the invention. It also has a carrier 9 on which an input part 2 is mounted movably and elastically returning into a rest position along a direction of movement B by means of mounting means 12 including springs. Moreover, vibration dampers that are not shown may also be provided in order to dampen the movement of the input part 2 with respect to the carrier. The input part 2 has an input surface 3 intended to be touched by an operator not shown in detail. The input part 2 is a touchscreen or touch pad, whereby a spatially resolving touch detection is made possible due to a measuring capacitance structure formed from an electrode structure, as a touch-detection device 5. The input assembly 1 further includes an electromagnetic actuator 4 consisting of an electrical coil 7 and an armature 8, which cooperates with the magnetic field of the coil 7 and is preferably at least partially permanently magnetic. When an electric control signal provided by an evaluation unit of the input assembly 1, which is not shown, is applied to the actuator 4, the input part 2 is deflected and moved in the direction of movement B, which is perceived by the operator as a haptic feedback and as a confirmation of the operation of the input assembly 1 performed by touching and/or actuating it. The electromagnetic actuator 4 is disposed between the input part 2 and the carrier 9 and has a direction of action in the direction of movement B without being supported on the carrier 9. The electromagnetic actuator 4 is configured as a linear resonant actuator and further includes an additional mass 10, which is resiliently mounted by means of the springs 11 and whose vibrational degree of freedom is substantially parallel to the direction of movement B and which, in contrast to the first embodiment, is not rigidly attached to the armature 8, but in this case rigidly attached to the coil 7, whereas the coil 7 and the additional mass 10 are resiliently mounted relative to the armature 8 via the springs 11. The armature 8 of the actuator 4 is attached to the input part 2, on the side facing away from the input surface 3, e.g. in the area of the center of gravity of the input part 3, exclusively via a vibration isolator 6. When a pulse-shaped control signal is applied to the coil, the coil 7 applies a pulse to the armature 8, which is transmitted on to the input part via the vibration isolator 6, while the additional mass 10 with the coil 7 absorbs the counter-pulse. The vibration isolator 6 is provided in order to decouple the input part 2 to the largest possible extent from the reverberations of the additional mass 10 and the coil 7. It consists substantially of an elastomer foam provided with an adhesive layer on the surfaces intended for abutting against the control part 2 and the actuator 4. In order to cause an effective vibration isolation, the natural frequency of the vibrating system consisting of the additional mass 10 and its resilient mounting 11 in the direction of movement B is greater by the factor of $A=\sqrt{2}$ than the natural frequency of the vibration isolator 6.

FIGS. 3a to 3c show excitation signals $A_1$ to $A_3$ according to the invention and associated system responses $S_1$ to $S_3$, which follow the excitation and are caused by it, and which is the vibration behavior respectively sensed in each case on the input surface 3 (of FIGS. 1-2), e.g. by means of a vibrometer. Thus, the control signal $A_1$, which is limited to a pulse of one polarity, due to the damping effect of the mounting means 12 (of FIGS. 1-2) including the vibration damper, and due to the damping effect of the vibration isolator 6 (of FIGS. 1-2), generates a damped and thus decaying vibration as a system response $S_1$. The excitation signal $A_1$ and the damping are set in such a way that the maximum attainable amplitude of the system response, also referred to as absolute maximum amplitude $X_{max}$, is obtained with the first, as shown here, or, at the latest, the second deflection.

Preferably, as FIG. 3b shows, care is taken that the control signal $A_2$ is designed such, with respect to its duration and its curve—here, it has one period and thus a pulse sequence of pulses of opposite polarities, that the maximum attainable amplitude of the system response, also referred to as the absolute maximum amplitude $X_{max}$, is reached within a time frame of <20 ms, wherein the aforementioned time frame is triggered by the start of the control signal.

FIG. 3c shows an embodiment of the control signal $A_3$ with a pulse sequence comprising two periods. The excitation signal $A_3$ and the damping are set in such a way that the maximum attainable amplitude of the system response, also referred to as absolute maximum amplitude $X_{max}$, is obtained with the second deflection. Moreover, the input part 2 (of FIGS. 1-3) and/or the actuator 4 (of FIGS. 1-2) is damped such, by means of the vibration damper belonging to the mounting means 12 (of FIGS. 1-4) that the "decay time" of the system amplitude measured at the input part 2 (of FIGS. 1-4), measured from 100% of the maximum amplitude to 10% or less of the maximum amplitude, is 20 ms.

The invention claimed is:

1. An input assembly, comprising:
    a carrier,
    an input part, which is mounted on the carrier in a manner capable of vibrating along at least one direction of movement by means of mounting means, the input part having an input surface intended to be touched by an operator and with a touch-detection device for detecting a touch upon the input surface by the operator, and
    an electromagnetic actuator for exciting a movement of the input part along the direction of movement by means of an electric control signal in order to generate a haptic feedback for the operator in the case of a touch by the operator, wherein the actuator has an additional mass that is resiliently mounted using a resilient mount and the actuator is attached to the input part via a vibration isolator;
    wherein the mounting means for vibration-capable mounting further include a vibration damper for causing a damping of the movement of the input part;
    wherein at least one of the control signal, a damping caused by the vibration isolator, and a further damping caused by the vibration damper is such that an absolute maximum amplitude of a system response, which is measured at the input part, to the excitation by means of the actuator triggered by the control signal occurs after a first maximum interval in time of 20 ms subsequent to a start of the control signal;
    wherein at least one of the control signal, the damping caused by the vibration isolator, and the further damping caused by the vibration damper is such that a decay instant at which a maximum amplitude of the system response has decayed to 10% or less of the absolute maximum amplitude follows a previously reached absolute maximum amplitude after a second interval in time of maximally 30 ms; and
    wherein a natural frequency of the vibrating system comprising the additional mass and its resilient mount is greater by a factor of $A=\sqrt{2}$ than a natural frequency of the vibration isolator.

2. The input assembly according to claim 1, wherein the actuator, when an electric control signal is applied, has a driven part, which is attached to the input part via the vibration isolator and on which the additional mass is resiliently mounted.

3. The input assembly according to claim 1, wherein the actuator is not supported on the carrier.

4. The input assembly according to claim 1, wherein the actuator is attached to the input part exclusively via the vibration isolator.

5. The input assembly according to claim 1, wherein the actuator is attached exclusively to the input part.

6. The input assembly according to claim 1, wherein the vibration isolator is wholly or partially formed from a plastic, preferably an elastomer.

7. The input assembly according to claim 1, wherein the vibration isolator is wholly or partially formed from a foam, such as PUR foam, PE foam, silicone elastomer, silicone rubber, sponge rubber and/or cellular rubber.

8. The input assembly according to claim 7, wherein the vibration isolator is formed as an integral foam.

9. The input assembly according to claim 1, wherein the actuator is configured as a linear resonant actuator (LRA).

10. The input assembly according to claim 1, wherein an electronic control system is provided for applying a control signal to the actuator, and the control signal is configured as a pulse signal, preferably a square-wave signal.

11. Use of the input assembly according to claim 1 in a motor vehicle.

12. The input assembly according to claim 1, wherein the resilient mount comprises at least one spring.

13. An input assembly, comprising:
    a carrier,
    an input part, which is mounted on the carrier in a manner capable of vibrating along at least one direction of movement by means of mounting means, the input part having an input surface intended to be touched by an operator and with a touch-detection device for detecting a touch upon the input surface by the operator, and an electromagnetic actuator for exciting a movement of the input part along the direction of movement by means of an electric control signal in order to generate a haptic feedback for the operator in the case of a touch by the operator, wherein the actuator has an additional mass that is resiliently mounted using a resilient mount and the actuator is attached to the input part via a vibration isolator;

wherein a natural frequency of the vibrating system comprising the additional mass and its resilient mount is greater by a factor of $A=\sqrt{2}$ than a natural frequency of the vibration isolator.

14. The input assembly according to claim 13, wherein at least one of the control signal and a damping caused by the vibration isolator is such that an absolute maximum amplitude of a system response, which is measured at the input part, to the excitation by means of the actuator triggered by the control signal occurs after a first maximum interval in time of 20 ms subsequent to a start of the control signal.

15. The input assembly according to claim 13, wherein at least one of the control signal and a damping caused by the vibration isolator is such that a decay instant at which a maximum amplitude of a system response has decayed to 10% or less of the absolute maximum amplitude follows a previously reached absolute maximum amplitude after a second interval in time of maximally 30 ms.

16. The input assembly according to claim 13, wherein the mounting means for vibration-capable mounting further include a vibration damper for causing a damping of the movement of the input part.

17. The input assembly according to claim 16, wherein at least one of the control signal, a damping caused by the vibration isolator, and a further damping caused by a vibration damper is such that an absolute maximum amplitude of a system response, which is measured at the input part, to the excitation by means of the actuator triggered by the control signal occurs after a first maximum interval in time of 20 ms subsequent to a start of the control signal.

18. The input assembly according to claim 16, wherein at least one of the control signal, a damping caused by the vibration isolator, and a further damping caused by a vibration damper is such that a decay instant at which a maximum amplitude of a system response has decayed to 10% or less of the absolute maximum amplitude follows a previously reached absolute maximum amplitude after a second interval in time of maximally 30 ms.

19. An input assembly, comprising:

a carrier, an input part, which is mounted on the carrier in a manner capable of vibrating along at least one direction of movement by means of mounting means, the input part having an input surface intended to be touched by an operator and with a touch-detection device for detecting a touch upon the input surface by the operator, and an electromagnetic actuator for exciting a movement of the input part along the direction of movement by means of an electric control signal in order to generate a haptic feedback for the operator in the case of a touch by the operator, wherein the actuator has an additional mass that is resiliently mounted using a resilient mount and the actuator is attached to the input part via a vibration isolator;

wherein at least one of the control signal and a damping caused by the vibration isolator is such that a decay instant at which a maximum amplitude of a system response has decayed to 10% or less of the absolute maximum amplitude follows a previously reached absolute maximum amplitude after a second interval in time of maximally 30 ms.

* * * * *